United States Patent
Fuchida et al.

(10) Patent No.: US 8,480,925 B2
(45) Date of Patent: Jul. 9, 2013

(54) DEPOLARIZING FILM, METHOD FOR PRODUCTION THEREOF, OPTICAL FILM, AND LIQUID CRYSTAL DISPLAY

(75) Inventors: Takehito Fuchida, Ibaraki (JP); Minoru Miyatake, Ibaraki (JP); Takashi Kamijo, Ibaraki (JP); Hideyuki Yonezawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/413,985

(22) Filed: Mar. 30, 2009

(65) Prior Publication Data
US 2009/0244474 A1    Oct. 1, 2009

(30) Foreign Application Priority Data
Apr. 1, 2008    (JP) ................. 2008-095299

(51) Int. Cl.
C09K 19/00    (2006.01)
C09K 19/06    (2006.01)
C09K 19/34    (2006.01)
C09K 19/52    (2006.01)

(52) U.S. Cl.
USPC ............... 252/299.01; 252/299.6; 428/1.1; 428/1.2; 428/1.3; 428/1.31

(58) Field of Classification Search
USPC .. 428/1.1, 1.3, 1.2, 1.31; 430/20; 252/299.01, 252/299.6, 299.66–299.68; 349/118, 123, 349/193
See application file for complete search history.

(56) References Cited

U.S. PATENT DOCUMENTS

| | | | |
|---|---|---|---|
| 5,052,791 A | 10/1991 | Kikuchi | |
| 7,037,443 B2 * | 5/2006 | Shuto et al. | 252/299.01 |
| 7,135,211 B2 * | 11/2006 | Shuto et al. | 428/1.3 |
| 7,527,833 B2 * | 5/2009 | Slaney et al. | 428/1.1 |
| 2002/0128341 A1 | 9/2002 | Sakai et al. | |
| 2004/0165126 A1 | 8/2004 | Ooi et al. | |
| 2005/0037155 A1 | 2/2005 | Shuto et al. | |
| 2005/0219447 A1 | 10/2005 | Slaney et al. | |
| 2006/0007375 A1 | 1/2006 | Nagashima et al. | |
| 2006/0103778 A1 | 5/2006 | Ooi et al. | |
| 2008/0170294 A1 * | 7/2008 | Kuroda et al. | 359/500 |

FOREIGN PATENT DOCUMENTS

| | | |
|---|---|---|
| EP | 1 420 275 A1 | 5/2004 |
| GB | 2 393 262 A | 3/2004 |
| JP | 2002-308831 A | 10/2002 |
| JP | 2005-148119 A | 6/2005 |
| JP | 2006-010912 A | 1/2006 |

OTHER PUBLICATIONS

European Search Report dated Jul. 13, 2009, issued in corresponding European Patent Application No. 09004371.2.
Korean Office Action dated Sep. 19, 2011, issued in corresponding Korean Patent Applicatiion No. 2009-0024753.
Japanese Office Action dated Apr. 20, 2012, issued in corresponding Japanese Patent Application No. 2008-095299.

* cited by examiner

*Primary Examiner* — Geraldina Visconti
(74) *Attorney, Agent, or Firm* — Westerman, Hattori, Daniels & Adrian, LLP

(57) ABSTRACT

A depolarizing film of the present invention comprises a film containing at least one liquid crystal compound, wherein the liquid crystal compound comprises a liquid crystal compound (1) that satisfies the relation: $0.05 \leq \Delta n \leq 0.5$, with the proviso that $\Delta n = ne - no$, ne represents an extraordinary-ray refractive index, and no represents an ordinary-ray refractive index, and the film has a haze value of 15% or less and a thickness of 1 μm to 10 μm.

18 Claims, 1 Drawing Sheet

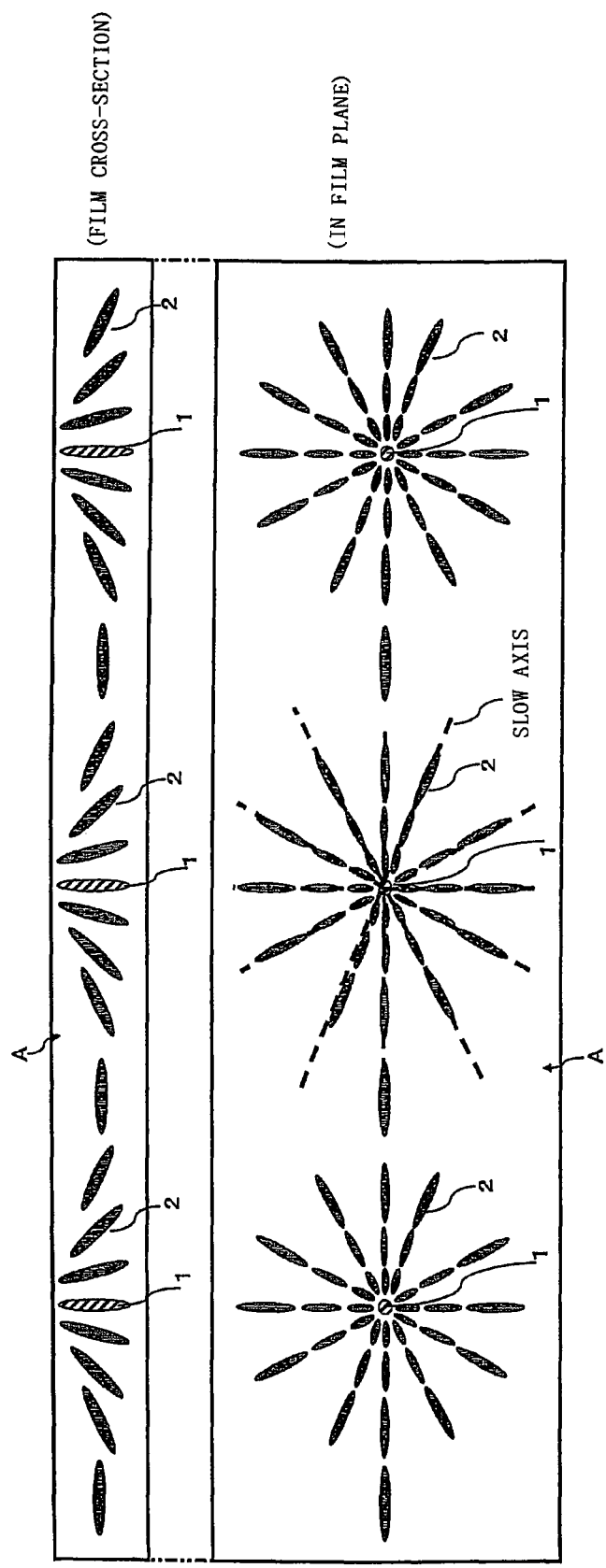

DEPOLARIZING FILM, METHOD FOR PRODUCTION THEREOF, OPTICAL FILM, AND LIQUID CRYSTAL DISPLAY

BACKGROUND OF THE INVENTION

1. Field of the Invention

The present invention relates to a depolarizing film and a method for production thereof. The depolarizing film may be used in combination with a polarizer or the like to form an optical film. The depolarizing film or the optical film is preferably used on the viewer side of a liquid crystal display for vehicle-mounted applications, mobile applications, information display applications, or the like.

2. Description of the Related Art

Liquid crystal displays are widely used in portable terminals such as cellular phones and personal digital assistants (PDAs), audio visual (AV) devices, game machines, digital cameras, film cameras, car navigation systems, and watches. Such liquid crystal display-equipped devices are used not only indoors but also outdoors. Such liquid crystal displays use liquid crystal switching to visualize changes in polarization state, and based on the display principle, the liquid crystal displays use polarizers and emit linearly polarized light.

In recent years, people occasionally wear sunglasses outdoors. In particular, polarizing sunglasses are preferably used in viewpoint of reduction of reflected light from water sides, road surfaces, and buildings. In some cases, however, people wearing polarizing sunglasses have difficulty seeing things on liquid crystal display-equipped devices, depending on the angle at which the people view the devices. In particular, displayed things become invisible, when the polarized light transmission axis of polarizing sunglasses is placed perpendicular to the polarized light transmission axis of the polarizer placed on the screen side of liquid crystal displays.

Concerning the problem with the visibility of liquid crystal displays for viewers wearing sunglasses, for example, it is proposed that a transparent cover layer comprising a birefringent material having a certain thickness distribution in the in-plane direction should be placed on the uppermost surface of a liquid crystal display (see JP-A No. 2005-148119). In the process of placing the transparent cover layer on the uppermost surface of a liquid crystal display as described in JP-A No. 2005-148119, however, it is necessary to precisely control the absorption axis of the viewer side polarizer and the slow axis of the transparent cover layer. In addition, since the transparent cover layer has to be shaped into a specific form, this technique has the problem of low productivity.

SUMMARY OF THE INVENTION

An object of the present invention is to provide a thin depolarizing film which is easy to be produced, and a method for production thereof.

Another object of the present invention is to provide an optical film using such a depolarizing film and to provide a liquid crystal display using such a depolarizing film.

As a result of investigations to solve the problems, the inventors have found that the depolarizing film and other techniques described below will satisfy the objects, and have completed the present invention.

The present invention relates to a depolarizing film comprising: a film containing at least one liquid crystal compound, wherein the liquid crystal compound comprises a liquid crystal compound (1) that satisfies the relation: $0.05 \leq \Delta n \leq 0.5$, with the proviso that $\Delta n = ne - no$, ne represents an extraordinary-ray refractive index, and no represents an ordinary-ray refractive index, and the film has a haze value of 15% or less and a thickness of 1 μm to 10 μm.

As the depolarizing film, the film is preferably used that the liquid crystal compound comprises the liquid crystal compound (1) and another liquid crystal compound (2), the liquid crystal compound (1) is vertically oriented in the direction of the thickness of the film, and the another liquid crystal compound (2) is oriented parallel to the surface of the film in all directions around a portion of the vertically oriented liquid crystal compound (1).

In the depolarizing film, the liquid crystal compound (1) preferably has a refractive index distribution satisfying $nx1 \approx ny1 < nz1$.

Note, $nx1$, $ny1$ and $nz1$ represent refractive indices of a film in X, Y and Z axis directions, respectively, when the liquid crystal compound (1) is used alone to form the film, wherein the X axis direction is a direction in which the in-plane refractive index of the film is maximum (the direction of an in-plane slow axis), the Y axis direction is a direction perpendicular to the X axis direction in the film plane (the direction of an in-plane fast axis), and the Z axis direction is the film thickness direction vertical to the X axis direction and the Y axis direction.

In the depolarizing film, the liquid crystal compound (2) has a refractive index distribution satisfying $nx2 > ny2 \approx nz2$.

Note, $nx2$, $ny2$ and $nz2$ represent refractive indices of a film in X, Y and Z axis directions, respectively, when the liquid crystal compound (2) is used alone to form the film, wherein the X axis direction is a direction in which the in-plane refractive index of the film is maximum (the direction of an in-plane slow axis), the Y axis direction is a direction perpendicular to the X axis direction in the film plane (the direction of an in-plane fast axis), and the Z axis direction is the film thickness direction vertical to the X axis direction and the Y axis direction.

In the depolarizing film, it is preferable that the depolarizing film comprises 1 to 15 parts by weight of the liquid crystal compound (1) based on 100 parts by weight of the liquid crystal compound (2).

The present invention also relates to a method for producing the above depolarizing film, comprising the steps of:

(1) preparing a solution containing the liquid crystal compounds (1) and (2);

(2) applying the solution to a substrate that does not undergo alignment treatment; and (3) solidifying the solution applied to the substrate to form a film.

The present invention also relates to an optical film comprising the above depolarizing film; and a polarizer.

The present invention also relates to a liquid crystal display comprising polarizers provided on both sides of a liquid crystal cell;

wherein the above depolarizing film is placed on a viewer side with respect to the polarizer on a viewer side.

The depolarizing film of the present invention includes a film and a liquid crystal compound contained in the film, wherein the liquid crystal compound includes at least a liquid crystal compound (1) that satisfies the relation: $0.05 \leq \Delta n \leq 0.5$, wherein Δn represents the difference (ne−no) between the extraordinary-ray refractive index (ne) and the ordinary-ray refractive index (no). The film has a haze value of 15% or less, which can satisfy transparency, and a thickness of 1 to 10 μm, which can realize a thin depolarizing film. The depolarizing film of the present invention is capable of converting linearly polarized light incident on the surface of the film in all directions into circularly polarized light.

For example, the above mentioned depolarizing film of the present invention may also be produced by the liquid crystal compound (1) and another liquid crystal compound (2) capable of generating in-plane retardation. In the film, the liquid crystal compound (1) may be vertically oriented in the direction of the thickness of the film, and the another liquid crystal compound (2) may be oriented parallel to the surface of the film in all directions around a portion of the vertically oriented liquid crystal compound (1). In this structure, the liquid crystal compound (2) may form a structure in which it is radially distributed in all directions around the vertically oriented liquid crystal compound (1), and the radially distributed liquid crystal compound (2) may be oriented in the range from inclined to parallel to the film plane by the influence of the liquid crystal compound (1). Such a film may have a multi-domain structure in which the mode of parallel orientation of the liquid crystal compound (2) radially distributed around the vertically oriented liquid crystal compound (1) continuously varies over the film plane. The liquid crystal compound (2) used in such a film is oriented to generate an in-plane retardation, and the portion having the radially aligned liquid crystal compound (2) has the slow axis in all directions of the film plane, theoretically 360°.

The in-plane retardation of the film can be controlled to be about $\lambda/4$ by controlling the thickness of the film and the in-plane retardation produced by the liquid crystal compound (2) oriented parallel to the film plane. It should be noted that when used alone in the description, the term "about $\lambda/4$" means about $\lambda/4+(550 \text{ nm}/2)$ n, wherein n is 0 or a positive integer. Thus, the depolarizing film of the present invention can have the slow axis to generate an in-plane retardation of about $\lambda/4$ theoretically in all directions of the film plane. Therefore, a combination of the depolarizing film and a polarizer can convert linearly polarized light in all directions into circularly polarized light, when the linearly polarized light is let out from the polarizer and let into the depolarizing film. Since the depolarizing film of the present invention has the slow axis in all directions of the film plane, theoretically 360°, as described above, it may be adhered to polarizers without careful consideration of the axis angle with the polarizers.

When the depolarizing film of the present invention is placed on the surface of a liquid crystal display (on the viewer side with respect to the viewer side polarizer), therefore, linearly polarized light is converted into circularly polarized light when emitted from the liquid crystal display, so that the information from the liquid crystal display can be observed with no loss of visibility by people wearing polarizing sunglasses.

For example, the depolarizing film of the present invention can be easily produced using the liquid crystal compound (1) with a specific birefringent liquid crystal polymer or the like, capable of being vertically oriented even when the substrate used does not undergo vertical alignment treatment, together with the liquid crystal compound (2). Even on a substrate that does not undergo vertical alignment treatment, the liquid crystal compound (1) with a specific birefringent liquid crystal polymer can be vertically oriented by a stress applied in the film-forming process. On the other hand, the liquid crystal compound (2) is not influenced by the orientation of the substrate but influenced by the liquid crystal compound (1) so that the liquid crystal compound (2) can be oriented parallel to the film plane around the liquid crystal compound (1).

BRIEF DESCRIPTION OF DRAWINGS

FIG. 1 is a schematic diagram including a cross-sectional view and a top view showing an example of the depolarizing film of the present invention.

DETAILED DESCRIPTION OF THE PREFERRED EMBODIMENTS

The depolarizing film of the present invention is described below with reference to the drawing. FIG. 1 illustrates a cross-sectional view and a top view each schematically illustrating the state of orientations of a liquid crystal compound (1) and another liquid crystal compound (2) in a film (A) with respect to the depolarizing film. The cross-sectional view of FIG. 1 shows that the liquid crystal compound (1) is vertically oriented in the direction of the thickness of the film (A); the portion of the liquid crystal compound (1) is placed at the center; the liquid crystal compound (2) is placed around the portion of the liquid crystal compound (1) and oriented in the range from inclined to parallel to the film plane; and a plurality of domains each having the liquid crystal compound (1) at the center are provided. The top view shows that the liquid crystal compound (2) is oriented in all directions of the film, namely 360° around the liquid compound (1). The compound (2) oriented in the parallel direction is omitted from the top view, while it is shown in the cross-sectional view. The top view only shows the compound (2) having a certain direction in each domain. As shown in the top view, the direction in which the liquid crystal compound (2) is oriented in the film plane corresponds to the slow axis direction, and the film (A) has the slow axis in all directions.

The liquid crystal compound (2) just has to form a portion in which it is oriented parallel to the film plane. In general, the liquid crystal compound (2) in the vicinity of the liquid crystal compound (1) is oriented in a direction oblique to the film plane, and the orientation of the liquid crystal compound (2) becomes close to parallel to the film plane as it is more distant from the liquid crystal compound (1). FIG. 1 illustrates a case where the liquid crystal compound (2) is oriented in such a manner that it evenly becomes parallel to the film plane over all directions around liquid crystal (1). Alternatively, the degree of the parallel orientation to the film plane may vary with the angle around the liquid crystal compound (1) (namely, the generated retardation may vary with the angle), as long as the liquid crystal compound (2) is oriented parallel to the film plane in all directions around the liquid crystal compound (1).

At least one type of liquid crystal compound is used to form a film for the depolarizing film of the present invention. The liquid crystal compound to be used preferably has transparency. Such a liquid crystal compound to be used includes at least a liquid crystal compound (1) that satisfies the relation: $0.05 \leq \Delta n \leq 0.5$, wherein $\Delta n = n_e - n_o$, wherein $n_e$ represents the extraordinary-ray refractive index, and $n_o$ represents the ordinary-ray refractive index. Preferably $\Delta n$ is from 0.07 to 0.3 ($0.07 \leq \Delta n \leq 0.3$), more preferably from 0.1 to 0.2 ($0.1 \leq \Delta n \leq 0.2$). If $\Delta n$ is less than 0.05, sufficient depolarization cannot be achieved. If $\Delta n$ is more than 0.5, the haze of the film may increase to a practically unsuitable level.

In view of transparency, the film of the depolarizing film of the present invention has a haze vale of 15% or less. The haze value is preferably 12% or less, more preferably 10% or less. The film of the depolarizing film of the present invention has a thickness of 1 to 10 μm. The thickness is preferably from 1 to 9 μm, more preferably from 1 to 8 μm. Such a thickness is preferred in order to reduce the thickness of the film, to control the in-plane retardation of the film to about λ/4, and to orient the liquid crystal compounds (1) and (2) as shown in FIG. 1. If the thickness is less than 1 μm, the orientation descried above cannot be achieved, and, therefore, a depolarizing film cannot be provided.

For example, the liquid crystal compound (1) to be used preferably provides a refractive index distribution satisfying nx1≈ny1<nz1. Such a refractive index distribution with respect to the liquid crystal compound (1) means that when a forming material of the liquid crystal compound (1) is used alone to form a film, the film has a refractive index distribution satisfying nx1≈ny1<nz1. The liquid crystal compound (1) has an optical axis in the direction of Z axis (the direction of the film thickness), and its principal refractive indices nx1 and ny1 are substantially the same, while nz1 is larger than each of nx1 and ny1.

The nx1, ny1 and nz1 values may each be measured at a temperature of 20° C. and a wavelength of 589.3 nm with an Abbe refractometer equipped with an analyzer at the eye lens part. The nx2, ny2 and nz2 values described later may also be measured in the same manner.

The relation nx1≈ny1 indicates that the difference between the refractive indices nx1 and ny1 is preferably 0.02 or less. As used herein, the symbol "≈" means that the refractive index difference is preferably within the acceptable range as stated above. The smaller the difference between the refractive indices nx1 and ny1, the smaller the refractive index difference in the normal direction and the better the transparency in the normal direction. The difference between the refractive indices nx1 and ny1 is preferably 0.01 or less, more preferably 0.005 or less, ideally 0. The extraordinary-ray refractive index (ne) and the ordinary-ray refractive index (no) correspond to nz1 and (nx1+ny1)/2, respectively.

A forming material of the liquid crystal compound (1) includes, for example, a liquid crystal material that can be homeotropically aligned. The homeotropically-orienting liquid crystal material includes a general nematic liquid crystal compound that be capable of homeotropic alignment with a vertical alignment agent, which is given in, for example, "Kagaku Sosetsu 44 (surface modification, edited by The Chemical Society of Japan, pp. 156 to 163).

The homeotropically-orienting liquid crystal material includes a homeotropically-orienting side-chain liquid crystal polymer. The homeotropically-orienting side-chain liquid crystal polymer may be mentioned, for example, a side-chain type liquid crystal polymer including a monomer unit (a) containing a liquid crystalline fragment side chain and a monomer unit (b) containing a non-liquid crystalline fragment side chain.

The side chain type liquid crystal polymer can realize a homeotropic alignment of the liquid crystal polymer to be generated nematic liquid crystal state with a treatment such as heat treatment, even without using a vertical alignment film.

The above-mentioned monomer unit (a) has a side chain with nematic liquid crystalline, for example, a monomer unit represented by the following formula (a) may be mentioned.

[Formula (a)]

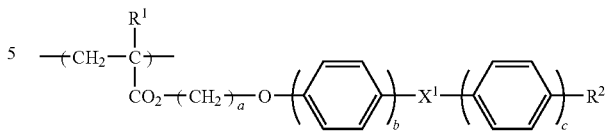

where, $R^1$ is a hydrogen atom or a methyl group, a is a positive integer of 1 to 6, $X^1$ is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively.

Moreover, as a monomer unit (b) has a linear side chain, for example, a monomer unit represented by the following formula (b) may be mentioned.

[Formula (b)]

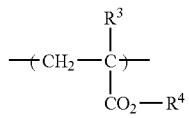

where, $R^3$ is a hydrogen atom or a methyl group, $R^4$ is an alkyl group with 1 to 22 carbon, a fluoroalkyl group with 1 to 22 carbon, or a monomer unit represented by the formula (b1):

     [Formula (b1)]

where, d is a positive integer of 1 to 6, and $R^5$ is an alkyl group with 1 to 6 carbon.

Besides, the ratio of the monomer unit (a) and the monomer unit (b) is not limited in particular. Although the ratio varies also according to the kinds of monomer units, since the side chain type liquid crystal polymer does not show liquid crystal monodomain alignment property when the ratio of the monomer unit (b) increases, the percentage is preferably defined in a range of (b)/{(a)+(b)}=0.01 to 0.8 (mole ratio), more preferably 0.1 to 0.5.

As the liquid crystal polymer that can form the homeotropic aligned liquid crystal layer, the side chain type liquid crystal polymer comprising the monomer unit (a) including a liquid crystalline fragment side chain and a monomer unit (c) including liquid crystalline fragment side chain having an alicyclic cyclic structure may be mentioned.

The side chain type liquid crystal polymer can realize a homeotropic alignment of the liquid crystal polymer, even without using a vertical alignment film, too. The monomer unit (c) has a side chain exhibiting a nematic liquid crystallinity, and, for example, such a monomer unit may be mentioned that is represented with the following formula (c):

[Formula (c)]

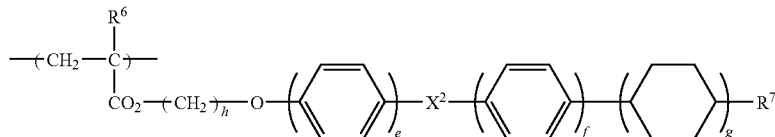

where, $R^6$ represents a hydrogen atom or a methyl group, h represents a positive integer of 1 to 6, $X^2$ represents a —$CO_2$— group or a —OCO-group, e and g represent integers of 1 or 2, f represents an integer of 0 to 2, and $R^7$ represents a cyano group and an alkyl group having a carbon number of 1 to 12.

In addition, a ratio of the monomer unit (a) and the monomer unit (c) is not especially limited, and may also be varied depending on kinds of the monomer units. Since the side chain type liquid crystal polymer tends to show less liquid crystal mono-domain alignment property as a percentage of the monomer unit (c) increases, preferably (c)/{(a)+(c)}=0.01 to 0.8 (mole ratio). Especially it is more preferably 0.1 to 0.6.

Liquid crystal polymers are not limited to the illustrated examples having the monomer units, and more than one of the illustrated monomer units may be appropriately combined.

A weight average molecular weight of the above-mentioned side chain type liquid crystal polymers is preferably in a range of 2,000 to 100,000. Performance as a liquid crystal polymer is demonstrated by adjusting the weight average molecular weight into this range. The weight average molecular weight is preferably 2,500 or more, because the film forming property of an alignment layer shows a tendency of being poor when the weight average molecular weight of the side chain type liquid crystal polymer is too small. On the other hand, the weight average molecular weight is preferably 50,000 or less because if the weight average molecular weight is too large the polymer has a tendency of forming a poor alignment state caused by a poor alignment property as liquid crystal.

Moreover, the above-illustrated side chain type liquid crystal polymer can be prepared by copolymerization of acrylic based monomers or methacrylic based monomers corresponding to the monomer unit (a), the monomer unit (b), and the monomer unit (c). And monomers corresponding to the monomer unit (a), the monomer unit (b), and the monomer unit (c) may be synthesized by well-known methods. Preparation of the copolymer may be performed according to, for example, conventional polymerization methods for acrylic based monomers, such as radical polymerization methods, cationic polymerization methods, and anion polymerization methods etc. In addition, when a radical polymerization method is used, various kinds of polymerization initiators may be used, and especially, polymerization initiators, such as azobis-iso-butyronitril, benzoyl peroxide, etc. may preferably be used that has medium, not excessively high nor excessively low, decomposition temperatures.

The liquid crystal compound (2) that is preferably used can be oriented parallel to the film plane in all directions around the portion of the vertically oriented liquid crystal compound (1). The liquid crystal compound (2) that is preferably used provides a refractive index distribution satisfying nx2>ny2≈nz2. Such a refractive index distribution with respect to the liquid crystal compound (2) means that when a forming material of the liquid crystal compound (2) is used alone to form a film, the film has a refractive index distribution satisfying nx2>ny2≈nz2.

The forming material of the liquid crystal compound (2) may be of any type, as long as it can provide the above refractive index distribution. In an embodiment, the material is preferably such that it can form a film having the above refractive index distribution through a process that includes applying a solution containing the material to a substrate that does not undergo alignment treatment and then solidifying the material. The term "solidifying" means not only that when the forming material of the liquid crystal compound (2) is nonreactive, the film is formed by simple solidification such as removal of solvent by drying but also that when the forming material of the liquid crystal compound (2) is reactive, the material is subjected to drying or the like and allowed to react to form the film. The forming material of the liquid crystal compound (2) in the latter case is mainly described below.

The liquid crystal compound (2) capable of providing a refractive index distribution satisfying nx2>ny2≈nz2 is preferably such that it can form a film in which the in-plane retardation (nx2−ny2) d of the film (wherein d (nm) is the thickness of the film) can be controlled to be about λ/4 (specifically 90 to 150 nm, preferably 100 to 140 nm)+(550 nm/2) n (wherein n is 0 or a positive integer). When the liquid crystal compound (2) capable of providing a refractive index distribution satisfying nx2>ny2≈nz2 is used, therefore, the thickness of the film of the depolarizing film is preferably controlled in the range of 1 to 10 μm, depending on the refractive index distribution property (nx2−ny2) of the liquid crystal compound (2).

Examples of birefringent materials capable of providing a refractive index distribution satisfying nx2>ny2≈nz2 include nematic liquid crystal monomers. Nematic liquid crystal monomers may be applied and then cured to form a film having the above refractive index distribution.

The nematic liquid crystal monomers include monomers represented by following formula (1). These liquid crystal monomers may be used independently, or two or more kinds may be used in combination.

[Formula (1)]

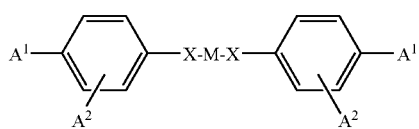

(1)

In the formula (1), $A^1$ and $A^2$ represent polymerizable groups, respectively, and they may be identical or may be different from each other. And, either of $A^1$ and $A^2$ may be hydrogen. X represents single bond, —O—, —S—, —C≡N—, —O—CO—, —CO—O—, —O—CO—O—, —CO—NR—, —NR—CO—, —NR—, —O—CO—NR—, —NR—CO—O—, —CH$_2$—O—, or —NR—CO—NR, respectively. R in the X represents H or C1 to C4 alkyl, and M represents a mesogen group. In the formula (1), although two of X may be identical or may be different from each other, they are preferably identical.

Two of A$^2$ in the monomer of the formula (1) are preferably bonded at ortho position with respect to corresponding A$^1$, respectively.

The A$^1$ and A$^2$ are preferably independently represented with following formula (2), respectively:

$$Z\text{—}X\text{-}(Sp)_n \qquad (2)$$

and A$^1$ and A$^2$ are preferably identical group each other.

In the formula (2), Z represents a cross-linking group, designations for X is identical as in the formula (1), Sp represents a spacer containing of linear or branched alkyl group having C atoms of 1 to 30, and n represents 0 or 1. A carbon chain in the Sp, for example, may contain oxygen in ether functional group, sulfur in thio-ether functional group, non-adjacent imino group or alkyl imino group having C1 to C4 etc.

In the formula (2), Z preferably is either of atomic groups represented with following formula (2a). In the following formula (2a), for example, R includes, groups, such as methyl, ethyl, n-propyl, i-propyl, n-butyl, i-butyl, and t-butyl.

[Formula (2a)]

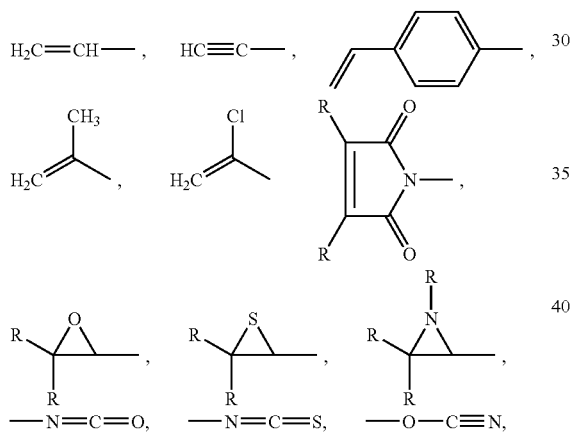

In the formula (2a), Sp preferably is either of atomic groups represented with following formula (2b). In the following formula (2b), m is preferably 1 to 3 and p is 1 to 12.

[Formula (2b)]

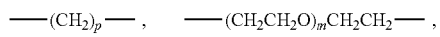

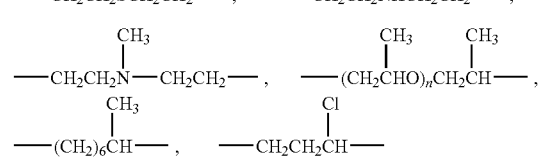

In the formula (1), M is preferably represented with following formula (3), and in the following formula (3), designations for X is identical as in the formula (1). Q, for example, represents a substituted, or non-substituted alkylene or aromatic hydrocarbon atomic group, and for example, it may be a substituted, or non-substituted linear, or branched C1 to C12 alkylene, etc.

[Formula (3)]

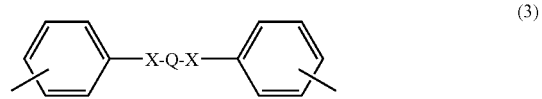

When the Q is an aromatic hydrocarbon atomic group, for example, it is preferably one of atomic groups represented with following formula (3a), or of substituted analogs thereof.

[Formula (3a)]

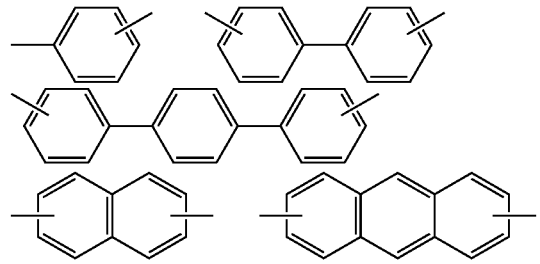

The substituted analog of the aromatic hydrocarbon atomic group represented with the formula (3a) may have, for example, 1 to 4 substituted groups per one aromatic ring, and may have one or two substituted groups per one of the aromatic ring or one group. The substituted groups may be identical with each other, may be different from each other. As the substituted groups, for example, C$_1$ to C$_4$ alkyls, nitro, halogens, such as, F, Cl, Br, and I, and phenyl, C$_1$ to C$_4$ alkoxyls etc. may be mentioned.

As examples of the liquid crystal monomer, for example, monomers represented with following formula (4) to (19) may be mentioned.

[Formula (4) to (15)]

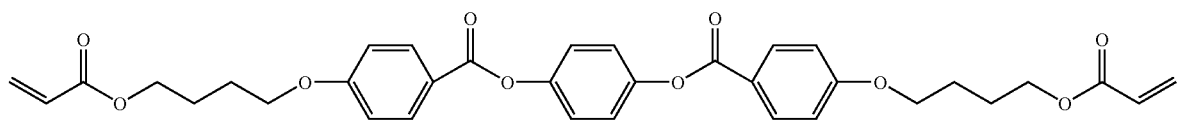

(5)
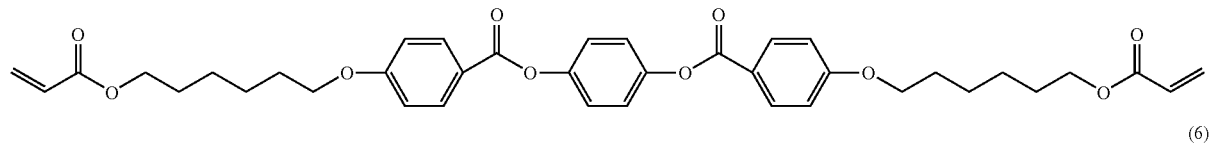
(6)
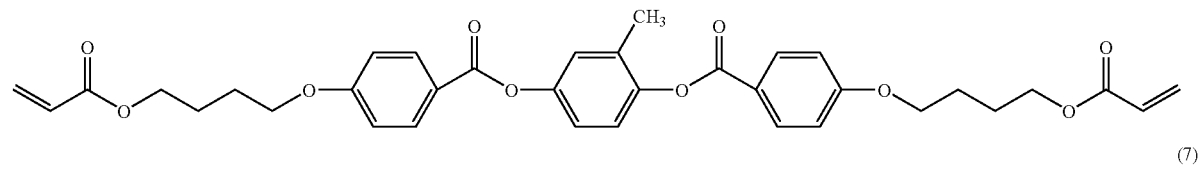
(7)
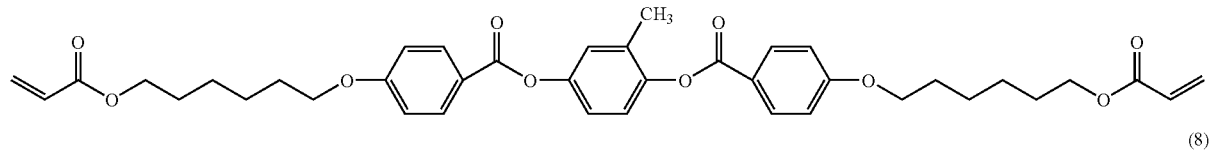
(8)
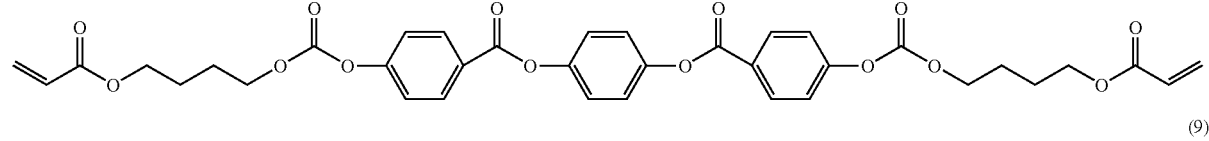
(9)
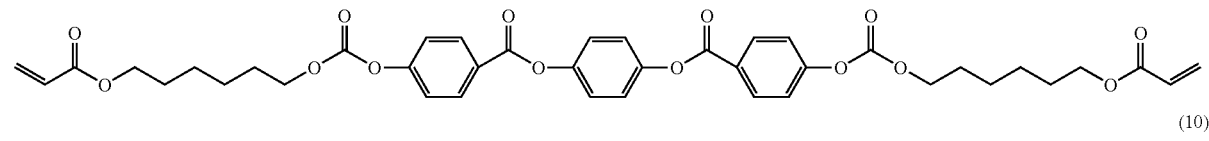
(10)
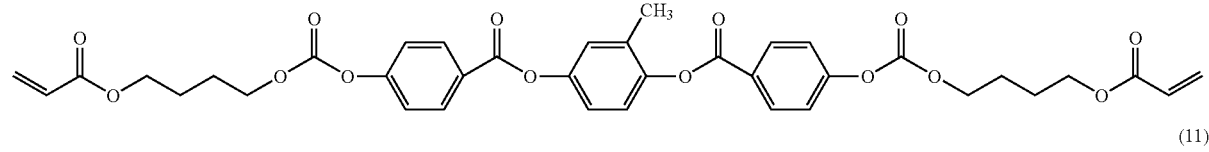
(11)
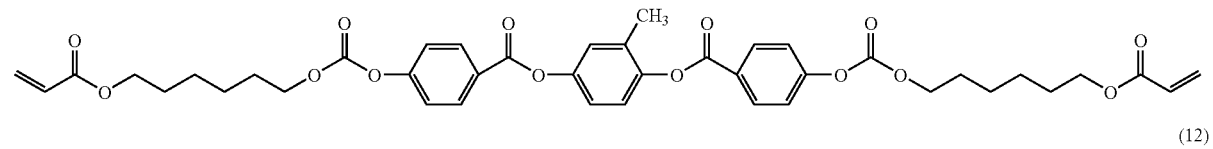
(12)
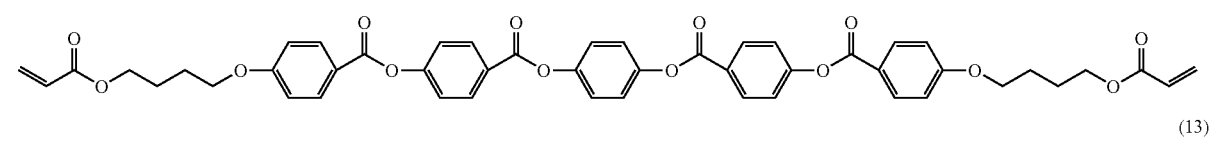
(13)
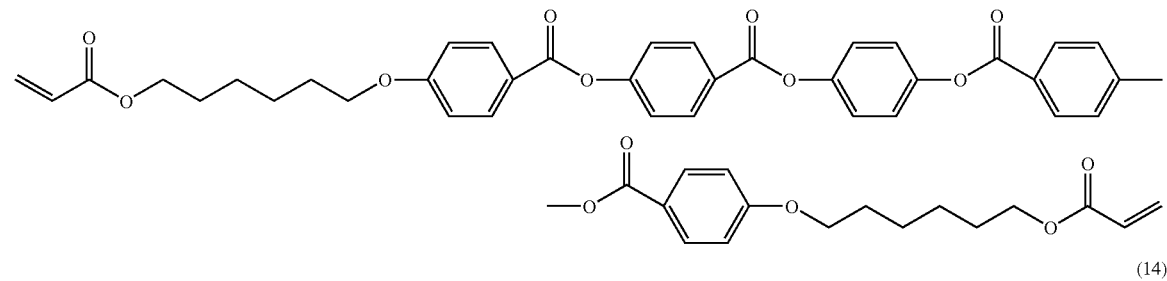
(14)
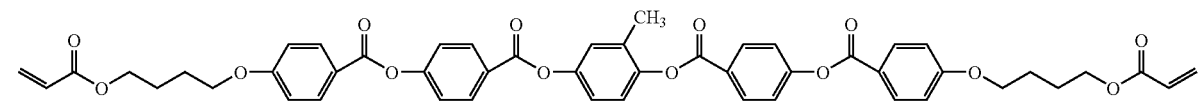

-continued

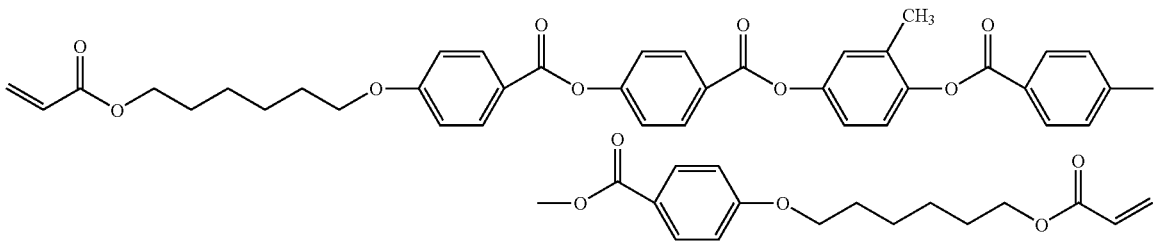
(15)

[Formula (16) to (19)]

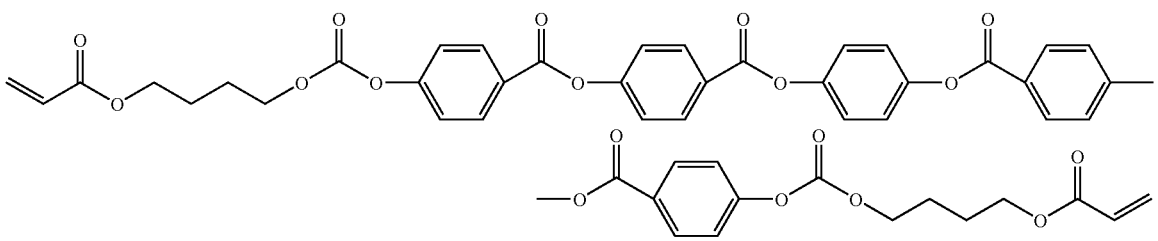
(16)

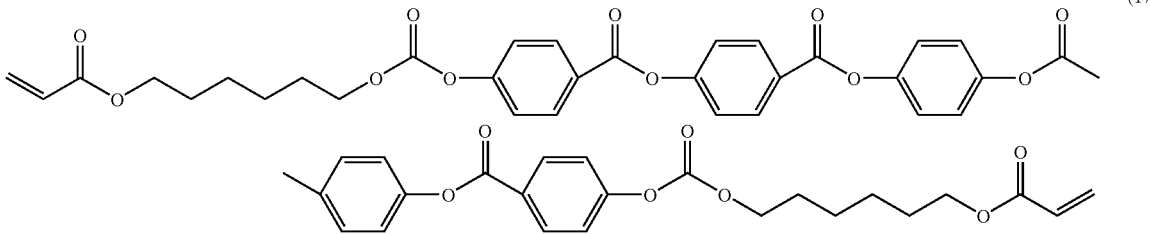
(17)

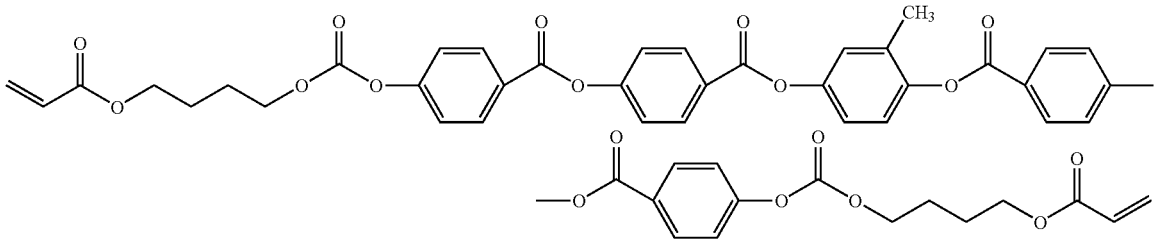
(18)

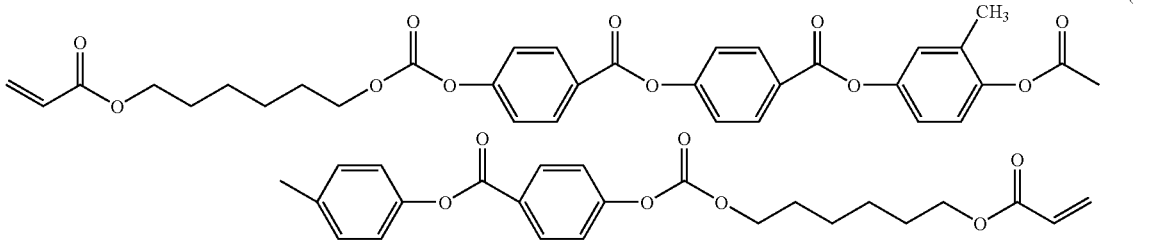
(19)

Temperature ranges in which the liquid crystal monomer shows liquid crystallinity vary based on a kind thereof, and for example, preferably it is in a range of 40 to 120° C., more preferably in a range of 50 to 100° C., and particularly preferably in a range of 60 to 90° C.

Besides the nematic liquid crystal monomers illustrated above, examples of birefringent materials capable of providing a refractive index distribution satisfying nx2>ny2≈nz2 also include polymers derived from nematic liquid crystal monomers.

When the depolarizing film of the present invention is substantially composed of the liquid crystal compounds (1 and (2), 1 to 15 parts by weight of the liquid crystal compound (1) is preferably blended based on 100 parts by weight of the liquid crystal compound (2), more preferably 2 to 10 parts by weight, even more preferably 2 to 8 parts by weight of the liquid crystal compound (1). If the blending ratio of the liquid crystal compound (1) is too low, the content of the liquid crystal compound (2) that is not oriented around the portion of the liquid crystal compound (1) can be high so that the haze vale of the film can be undesirably high. If the blending ratio of the liquid crystal compound (1) is too high, the content of the liquid crystal compound (2) can be too low so that it can be undesirably difficult to orient the liquid crystal compound (2) in all directions of the film plane.

The depolarizing film of the present invention may be typically obtained by a process including the steps of:

(1) preparing a solution containing the liquid crystal compounds (1) and (2);

(2) applying the solution to a substrate that does not undergo alignment treatment; and (3) solidifying the solution applied to the substrate to form a film.

In the step (1), the liquid crystal compounds (1) and (2) are dispersed or dissolved to prepare a solution. The solvent used to form the solution may dissolve both the liquid crystal compounds (1) and (2) or dissolve only the liquid crystal compound (1) but allow the forming material of liquid crystal compound (2) to be dispersed therein. The solvent may be appropriately selected depending on the materials. Examples of solvents that may be used include ester solvents such as ethyl acetate, propyl acetate, butyl acetate, isobutyl acetate, butyl propionate, and caprolactone; ketone solvents such as acetone, methyl ethyl ketone, methyl propyl ketone, methyl isopropyl ketone, methyl isobutyl ketone, diethyl ketone, cyclopentanone, cyclohexanone, and methylcyclohexanone; hydrocarbon solvents such as toluene; sulfoxide solvents such as dimethylsulfoxide; amide solvents such as dimethylformamide, dimethylacetamide, and N-methylpyrrolidone; and halogenated hydrocarbon solvents such as methylene chloride and chloroform. One or more of these solvents may be used alone or in combination. The solvent is preferably a ketone solvent or a combination of a ketone solvent and an ester solvent or a hydrocarbon solvent. In particular, a combination of ethyl acetate and cyclopentanone, a combination of acetone and cyclopentanone, or a combination of toluene and cyclopentanone is preferred in view of the solubility of the liquid crystal compounds (1) and (2) or easiness of formation of the structure illustrated in FIG. 1. The solids content of the solution is generally adjusted to 10 to 50% by weight, preferably 25 to 35% by weight.

When a photopolymerizable compound(s) is used for the liquid crystal compound (1) and/or the liquid crystal compound (2), a photopolymerization initiator may be added to the solution. Examples of such a photopolymerization initiator include Irgacure 907, 184, 651, and 369 each manufactured by Ciba Specialty Chemicals Inc. The photopolymerizable compound may be immobilized by ultraviolet irradiation. In general, the photopolymerization initiator is preferably added in an amount of about 0.5 to about 10 parts by weight, more preferably 1 to 8 parts by weight, based on 100 parts by weight of the photopolymerizable compound.

The solution may also contain various additives and so on. For example, if necessary, an ultraviolet absorbing agent, an antioxidant, a surfactant, or the like may be added, in the manufacturing process, for the desired purpose such as the purpose of imparting leveling capability or improving the durability of the film.

If bubbles enter the solution under stirring, the bubbles may cause isotropic scattering after the film is formed. For example, therefore, the solution may be degassed immediately before a film is produced from the solution. Examples of the degassing method that may be used include, but not limited to, a method of allowing the solution to stand under pressurized or vacuum conditions, and a method of heating the solution at a temperature where the solvent hardly vaporizes.

In the next step (2), the solution is applied to a substrate that does not undergo alignment treatment. Any known method of application may be used, such as spin coating, roll coating, flow coating, printing, dip coating, film casting, bar coating, or gravure printing.

The substrate may be in the form of any of a glass substrate, a plastic sheet and a plastic film. The thickness of the substrate is generally from about 10 to about 1000 μm.

The plastic film may be made of any plastic material that shows no change at the temperature where the liquid crystal compounds (1) and (2) are oriented. Examples of the plastic film include films of transparent polymers such as polyester polymers such as polyethylene terephthalate and polyethylene naphthalate, cellulose polymers such as diacetyl cellulose and triacetyl cellulose, polycarbonate polymers, acrylic polymers such as poly(methyl methacrylate), styrene polymers such as polystyrene and acrylonitrile-styrene copolymers, olefin polymers such as polyethylene, polypropylene, cyclic or norbornene structure-containing polyolefins, and ethylene-propylene copolymers, vinyl chloride polymers, amide polymers such as nylon and aromatic polyamide, imide polymers, sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers, epoxy polymers, and blends of any of the above polymers.

Among the plastic films, a norbornene structure-containing plastic film or a saponified cellulose film used as the substrate may also be used as a part of the depolarizing film, because its optical anisotropy is very low.

In the next step (3), the solution applied to the substrate is solidified to form a film.

When the liquid crystal compound (1) and/or the liquid crystal compound (2) includes no photopolymerizable compound, the solution may be solidified by removal of the solvent by drying. The drying temperature and the drying time period are not particularly limited and may be set, as appropriate, depending on the concentration of the solution, the type of the solvent, or the like. The drying temperature is typically from 30 to 200° C., preferably from 50 to 150° C., in particular, preferably from 70 to 130° C. The drying time period is typically from 1 to 50 minutes, preferably from 2 to 10 minutes, in particular preferably 3 to 5 minutes.

When the forming materials of liquid crystal compound (1) and/or the liquid crystal compound (2) includes a photopolymerizable compound, the solution may be solidified by curing the photopolymerizable compound by ultraviolet irradiation after the drying process. The ultraviolet irradiation conditions preferably include an inert gas atmosphere in order to achieve sufficient surface curing. The ultraviolet irradiation is generally performed at a total dose of about 100 to 500 mJ/cm$^2$. An ultraviolet high-pressure mercury lamp, a UV metal halide lamp, or the like may be used as the ultraviolet irradiation device.

In the resulting depolarizing film, the liquid crystal compound (1), particularly the liquid crystal compound (1) capable of providing a refractive index distribution satisfying $nx1 \approx ny1 < nz1$, specifically a homeotropically-orienting side-chain liquid crystal polymer, can be vertically oriented in the film thickness direction, even when no vertical alignment film is used. The liquid crystal compound (2) capable of providing a refractive index distribution satisfying $nx2 > ny2 \approx nz2$ is not influenced by the orientation of the substrate but oriented parallel to the film plane in all directions around the portion of the liquid crystal compound (1) by the influence of the vertically oriented liquid crystal compound (1).

The depolarizing film of the present invention is highly practical, because it can be easily produced by the production method of the present invention and has a high level of performance and other properties even though it is relatively thin.

The film of the depolarizing film of the present invention has a thickness of 1 to 10 μm. Within this thickness range, the in-plane retardation of the film can be controlled to be about λ/4 as described above depending on the type of the liquid crystal compound (2). Any method may be used to control the thickness. For example, the thickness may be controlled by appropriately controlling the amount of application of the solution in the process of producing a film from the solution.

The depolarizing film of the present invention may be used in combination with a polarizer to form an optical film.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A polarizer may be used as it is to form the optical film. Alternatively, a polarizing plate is generally used, which includes a polarizer and a transparent protective film placed on one or both sides of the polarizer.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, transparent protective film as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the transparent protective films made from polymer materials different from each other may also be used on respective both sides thereof. If the transparent protective films are made from different polymer materials, the depolarizing film of the present invention is applied to the transparent protective film placed on a viewer side.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have thickness direction retardation (Rth) of about 60 nm or less, while having in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with in-plane retardation (Re) of almost zero and thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl(meth)acrylate-styrene copolymers (such as MS resins), and alicyclic hydrocarbon group-containing polymers (such as methyl methacrylate-cyclohexyl methacrylate copolymers and methyl methacrylate-norbornyl(meth)acrylate copolymers). Poly($C_{1-6}$ alkyl(meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by the following formula (d):

[Formula (d)]

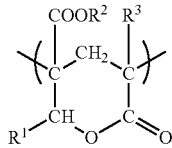

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by the formula (d) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by the formula (d) in the lactone ring structure-containing (meth)acrylic resin is less than 5% by weight, its heat resistance, solvent resistance or surface hardness can be insufficient. If the content of the lactone ring structure represented by the formula (d) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has in-plane retardation of 40 to 100 nm, a thickness retardation of 100 to 320 nm, and an Nz coefficient of 1.8 to 4.5. For example, the retardation plate satisfying the relation nx>ny=nz (positive A-plate) to be used preferably has in-plane retardation of 100 to 200 nm. For example, the retardation plate satisfying the relation nz=nx>ny (negative A plate) to be used preferably has in-plane retardation of 100 to 200 nm. For example, the retardation plate satisfying the relation nx>nz>ny to be used preferably has in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (positive A-plate, biaxial, negative C-plate) is preferred. In VA mode, preferable are combination of a positive A-plate and a negative C-plate or a single use of a biaxial film. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, a biaxial film satisfying the relation nx>nz>ny on the upper side with no retardation on the lower side or a positive A-plate provided on the upper side with a positive C-plate provided on the lower side). When it has retardation, it preferably has a retardation Re in the range of −500 to 500 nm and retardation Rth in the range of −500 to 500 nm. In terms of three-dimensional refractive index, nx>ny=nz, nx>nz>ny, nz>nx=ny, or nz>nx>ny (positive A-plate, biaxial, positive C-plate) is preferred.

The film with retardation may be separately prepared and laminated to a transparent protective film with no retardation so that the function described above can be provided.

The polarizer or the transparent protective film may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer, which is exemplified such as diffusion layer of backlight side.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 20 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

An adhesive may be used to bond the polarizer to the transparent protective film. Examples of the adhesive include isocyanate adhesives, polyvinyl alcohol adhesives, gelatin adhesives, vinyl adhesives, latex adhesives, and aqueous polyester adhesives. The adhesive is generally used in the form of an aqueous solution generally having a solids content of 0.5 to 60% by weight. Besides the above adhesives, ultraviolet-curable adhesives, electron beam-curable adhesives or the like may also be used to bond the polarizer to the transparent protective film. Electron beam-curable adhesives for polarizing plates exhibit good adhesion to the above different types of transparent protective films. Adhesives that may be used in an embodiment of the present invention may also contain a metal compound filler.

The depolarizing film of the present invention or the optical film including the depolarizing film and a polarizer may be used for a liquid crystal display.

The liquid crystal display may be fabricated according to conventional techniques. The liquid crystal display is generally formed by assembling a liquid crystal cell and optional components such as a lighting system and incorporating a driving circuit. The liquid crystal display also includes polarizers provided on both sides of the liquid crystal cell. The depolarizing film of the present invention may be used to form any liquid crystal display according to conventional techniques, except that it is placed on the viewer side with respect to the viewer side polarizer. The liquid crystal cell to be used may be of any type, such as TN type, STN type, n type, VA type, or IPS type.

A backlight or a reflector may be used for the lighting system to form the desired liquid crystal display. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Besides the above components, various optical films may also be used for the liquid crystal display. An optical film may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the transparent protective film, on which a reflective layer of concavo-convex structure is prepared, may be mentioned. The reflective layer that has the fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarization plate is effectively used to give a monochrome display without the coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

The elliptically polarization plate and the reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the separated type polarization plate. Therefore, a polarization plate may be a reflection type elliptically polarization plate or a semi-transmission type elliptically polarization plate, etc. in which the reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure-sensitive adhesive layer, may be used for laminating. On the occasion of adhesion of the above described polarizing plate and other optical layers, the optical axis may be set as a suitable configuration angle according to the target retardation characteristics etc.

The depolarizing film or the optical film laminating the depolarizing film and the polarizer of the present invention, a pressure-sensitive adhesive layer may also be prepared for adhesion with other members. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the depolarizing film or the optical film. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on the depolarizing film or the optical film using suitable developing methods, such as flow method and coating method, or a method in which a pressure-sensitive adhesive layer is once formed on a separator, as mentioned above, and is then transferred on the depolarizing film or the optical film may be mentioned.

A pressure-sensitive adhesive layer may also be prepared on one side or both sides of the depolarizing film or the optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of the depolarizing film or the optical film. Thickness of a pressure-sensitive adhesive layer may be suitably determined depending on a purpose of usage or adhesive strength, etc., and generally is 1 to 500 μm, preferably 1 to 200 μm, and more preferably 1 to 100 μM.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, ultraviolet absorbing property may be given to the each layer of the depolarizing film or the optical film and the pressure-sensitive adhesive layer etc., using a method of adding UV absorbents, such as salicylic acid ester type compounds, benzophenol type compounds, benzotriazol type compounds, cyano acrylate type compounds, and nickel complex salt type compounds.

EXAMPLES

The present invention is more specifically described with the examples below which are not intended to limit the scope of the present invention.

Example 1

A depolarizing film was produced as described below.

A side-chain liquid-crystalline acrylic polymer (5,000 in weight average molecular weight) represented by the below formula (e) below was used.

[Formula (e)]

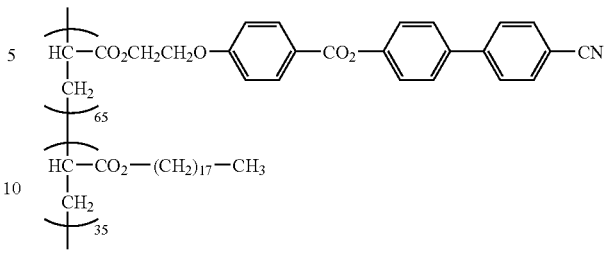

wherein, each number indicates the molar percentage (% by mole) of each monomer unit, and, for convenience's sake, a block polymer form is represented by the formula (e).

10 parts by weight of the side-chain liquid-crystalline acrylic polymer, 90 parts by weight of the liquid crystalline diacrylic monomer represented by the above mentioned formula (10), and 7.5 parts by weight of a photopolymerization initiator (Irgacure 907 (product name) manufactured by Adeka Corporation) were dissolved in a mixed solvent of cyclopentanone and ethyl acetate (8:2 in weight ratio) to prepare a coating liquid having an adjusted concentration of 30% by weight. The coating liquid was applied to a substrate (Zeonor ZF-100 (product name) manufactured by Zeon Corporation) with a wire bar coater. The coating was then dried at 80° C. for 3 minutes and exposed to ultraviolet radiation at a total dose of 300 mJ/cm$^2$ so that a 3 μm-thick depolarizing film was obtained.

In this process, the side-chain liquid-crystalline acrylic polymer is an example of the liquid crystal compound (1), and the liquid crystalline diacrylic monomer is an example of the liquid crystal compound (2). As a result of another process, it was demonstrated that when each of these materials was used alone to form a film, the side-chain liquid-crystalline acrylic polymer provided a refractive index distribution satisfying nx1≈ny1<nz1, and the liquid crystalline diacrylic monomer provided a refractive index distribution satisfying nx2>ny2≈nz2. The demonstration was performed at 23° C. and a wavelength of 590 nm using an automatic birefringence measuring system (Automatic Birefringence Analyzer Kobra-WPR, manufactured by Oji Scientific Instruments).

The Δn of the side-chain liquid-crystalline acrylic polymer was 0.199. Concerning Δn=ne−no, the extraordinary-ray refractive index value (ne) and the ordinary-ray refractive index value (no) were measured with Kobra-WPR manufactured by Oji Scientific Instruments.

Concerning the liquid crystalline diacrylate monomer, nx2−ny2 was 0.129, from which the in-plane retardation (nx2−ny2)d (the thickness was 3,000 nm) was calculated to be 387 nm. This in-plane retardation corresponds to about λ/4+(550 nm/2).

Example 2

A depolarizing film was obtained using the process of Example 1, except that the amounts of the side-chain liquid-crystalline acrylic polymer and the liquid crystalline diacrylic monomer were changed to 5 parts by weight and 95 parts by weight, respectively, when the coating liquid was prepared.

Comparative Example 1

A depolarizing film was obtained using the process of Example 1, except that 100 parts by weight of the liquid crystalline diacrylic monomer was used instead, with no side-chain liquid-crystalline acrylic polymer, when the coating liquid was prepared.

Comparative Example 2

A depolarizing film was obtained using the process of Example 1, except that the coating liquid was applied to the substrate so that the resulting film would have a thickness of 0.8 μm.

The depolarizing film obtained in each example was evaluated as described below. Table 1 shows the result of the evaluation described below together with the thickness and the in-plane retardation.

(Measurement of Haze)

The haze value (%) was measured by C light transmission method with Model HR-100 (manufactured by Murakami Color Research Laboratory Co., Ltd.) in the atmosphere at 25° C.

(Depolarization)

The depolarizing film was sandwiched between two crossed- or parallel-Nicol polarizing plates, and the transmittance of the resulting structure was measured at 550 nm with a high-speed spectrophotometer Standard Model DOT-3 manufactured by Murakami Color Research Laboratory Co., Ltd. In the crossed- or parallel-Nicol arrangement, the transmittance was measured when the longitudinal direction of the depolarizing film was aligned to coincide with the absorption axis of one of the polarizing plates (0°) and when it was then turned counterclockwise by 45° (45°), respectively.

TABLE 1

| | Thickness (μm) | Haze value (%) | Depolarization (transmittance (%)) | | | |
|---|---|---|---|---|---|---|
| | | | Crossed-Nicol | | Parallel-Nicol | |
| | | | 0° | 45° | 0° | 45° |
| Example 1 | 3 | 8.0 | 9.04 | 9.55 | 23.92 | 23.71 |
| Example 2 | 3 | 0.3 | 24.42 | 9.09 | 9.09 | 26.34 |
| Comparative Example 1 | 3 | 20.3 | 14.77 | 16.34 | 19.39 | 16.34 |
| Comparative Example 2 | 0.8 | 3.6 | 0.69 | 0.87 | 34.97 | 33.54 |

Table 1 shows that the depolarizing film obtained in each example has transparency and in-plane retardation of about λ/4+(550 nm/2) based on the liquid crystal compound (2) and can depolarize light in all directions of the film. In Comparative Example 1, the liquid crystal compound (2) is not oriented, because the liquid crystal compound (1) is not used, and the haze is so high that the transparency is insufficient. In Comparative Example 2, the film is so thin that it cannot have the depolarization function (in the crossed-Nicol arrangement, the transmittance is relatively low).

What is claimed is:

1. A depolarizing film comprising: a single film containing a liquid crystal compound (1) and a liquid crystal compound (2), wherein
    the liquid crystal compound (1) satisfies the relation: $0.05 \leq \Delta n \leq 0.5$, with the proviso that $\Delta n = ne - no$, ne represents an extraordinary-ray refractive index, and no represents an ordinary-ray refractive index,
    the liquid crystal compound (1) is vertically oriented in the direction of the thickness of the single film, and
    the liquid crystal compound (2) is oriented parallel to the surface of the single film in all directions around a portion of the vertically oriented liquid crystal compound (1),
    the single film has a haze value of 15% or less and a thickness of 1 μm to 10 μm, and
    wherein the single film comprises 1 to 15 parts by weight of the liquid crystal compound (1) based on 100 parts by weight of the liquid crystal compound (2).

2. The depolarizing film according to claim 1,
    wherein the liquid crystal compound (1) has a refractive index distribution that is different from the refractive index distribution of the liquid crystal compound (2).

3. The depolarizing film according to claim 1, wherein the liquid crystal compound (1) has a refractive index distribution satisfying $nx1 \approx ny1 < nz1$, wherein nx1, ny1 and nz1 represent refractive indices of a film in X, Y and Z axis directions, respectively, when the liquid crystal compound (1) is used alone to form the film, wherein the X axis direction is a direction in which the in-plane refractive index of the film is maximum (the direction of in-plane slow axis), the Y axis direction is a direction perpendicular to the X axis direction in the film plane (the direction of in-plane fast axis), and the Z axis direction is the film thickness direction vertical to the X axis direction and the Y axis direction.

4. The depolarizing film according to claim 1, wherein the liquid crystal compound (2) has a refractive index distribution satisfying $nx2 > ny2 \approx nz2$, wherein nx2, ny2 and nz2 represent refractive indices of a film in X, Y and Z axis directions, respectively, when the liquid crystal compound (2) is used alone to form the film, wherein the X axis direction is a direction in which the in-plane refractive index of the film is maximum (the direction of in-plane slow axis), the Y axis direction is a direction perpendicular to the X axis direction in the film plane (the direction of in-plane fast axis), and the Z axis direction is the film thickness direction vertical to the X axis direction and the Y axis direction.

5. A method for producing the depolarizing film according to claim 1, comprising the steps of:
    (1) preparing a solution containing the liquid crystal compounds (1) and (2);
    (2) applying the solution to a substrate that does not undergo alignment treatment; and
    (3) solidifying the solution applied to the substrate to form a single film.

6. An optical film comprising the depolarizing film according to claim 1 and a polarizer.

7. A liquid crystal display comprising polarizers provided on both sides of a liquid crystal cell;
    wherein the depolarizing film according to claim 1 is placed on a viewer side with respect to the polarizer on a viewer side.

8. The depolarizing film according to claim 1, wherein the liquid crystal compound (1) has a refractive index distribution satisfying $nx1 \approx ny1 < nz1$, wherein nx1, ny1 and nz1 represent refractive indices of a film in X, Y and Z axis directions, respectively, when the liquid crystal compound (1) is used alone to form the film, wherein the X axis direction is a direction in which the in-plane refractive index of the film is maximum (the direction of in-plane slow axis), the Y axis direction is a direction perpendicular to the X axis direction in the film plane (the direction of in-plane fast axis), and the Z axis direction is the film thickness direction vertical to the X axis direction and the Y axis direction, and wherein the liquid crystal compound (2) has a refractive index distribution satisfying nx2>ny2≈nz2, wherein nx2, ny2 and nz2 represent refractive indices of a film in X, Y and Z axis directions, respectively, when the liquid crystal compound (2) is used alone to form the film, wherein the X axis direction is a direction in which the in-plane refractive index of the film is maximum (the direction of in-plane slow axis), the Y axis direction is a direction perpendicular to the X axis direction in the film.

9. The depolarizing film according to claim 1, wherein the liquid crystal compound (1) is a homeotropically-orienting liquid crystal material.

10. The depolarizing film according to claim 9, wherein the homeotropically-orienting liquid crystal material comprises a homeotropically-orienting side-chain liquid crystal polymer.

11. The depolarizing film according to claim 9, wherein the homeotropically-orienting side-chain liquid crystal polymer comprises a monomer unit represented by formula (a)

[Formula (a)]

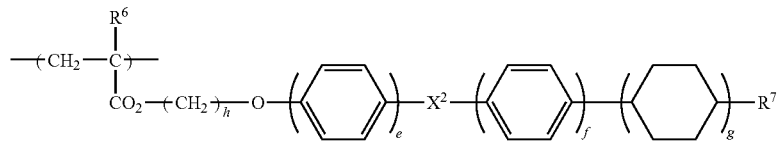

where, $R^1$ is a hydrogen atom or a methyl group, a is a positive integer of 1 to 6, $X^1$ is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively.

12. The depolarizing film according to claim 9, wherein the homeotropically-orienting side-chain liquid crystal polymer comprises a monomer unit represented by formula (b)

[Formula (b)]

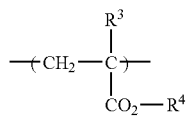

where, $R^3$ is a hydrogen atom or a methyl group, $R^4$ is an alkyl group with 1 to 22 carbon, a fluoroalkyl group with 1 to 22 carbon, or a monomer unit represented by the formula (b1):

$-(CH_2.CH_2-O)_d-R^5$      [Formula (b1)]

where, d is a positive integer of 1 to 6, and $R^5$ is an alkyl group with 1 to 6 carbon.

13. The depolarizing film according to claim 9, wherein the homeotropically-orienting side-chain liquid crystal polymer comprises a monomer unit represented by formula (c)

[Formula (c)]

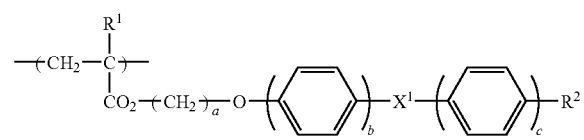

where, $R^6$ represents a hydrogen atom or a methyl group, h represents a positive integer of 1 to 6, $X^2$ represents a —$CO_2$— group or a —OCO-group, e and g represent integers of 1 or 2, f represents an integer of 0 to 2, and $R^7$ represents a cyano group and an alkyl group having a carbon number of 1 to 12.

14. The depolarizing film according to claim 9, wherein the homeotropically-orienting side-chain liquid crystal polymer comprises a monomer unit represented by Formula (a), and a monomer unit represented by Formula (b) and a monomer unit represented by Formula (c):

[Formula (a)]

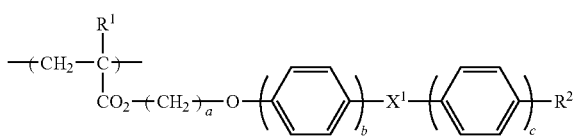

where, $R^1$ is a hydrogen atom or a methyl group, a is a positive integer of 1 to 6, $X^1$ is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively;

[Formula (b)]

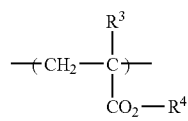

where, $R^3$ is a hydrogen atom or a methyl group, $R^4$ is an alkyl group with 1 to 22 carbon, a fluoroalkyl group with 1 to 22 carbon, or a monomer unit represented by the formula (b1):

$-(CH_2.CH_2-O)_d-R^5$      [Formula (b1)]

where, d is a positive integer of 1 to 6, and $R^5$ is an alkyl group with 1 to 6 carbon; and

[Formula (c)]

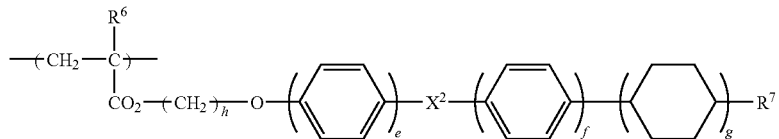

where, $R^6$ represents a hydrogen atom or a methyl group, h represents a positive integer of 1 to 6, $X^2$ represents a —$CO_2$— group or a —OCO-group, e and g represent integers of 1 or 2, f represents an integer of 0 to 2, and $R^7$ represents a cyano group and an alkyl group having a carbon number of 1 to 12.

15. The method for producing the depolarizing film according to claim 5 wherein the solution comprises at least one of the following solvents an ester solvent, a ketone solvent, a hydrocarbon solvent, an amide solvent and a halogenated hydrocarbon solvent.

16. The method for producing the depolarizing film according to claim 5 wherein prior to the applying step, the solution undergoes a degassing step.

17. The method for producing the depolarizing film according to claim 5 wherein the solidifying step comprises a drying step.

18. The method for producing the depolarizing film according to claim 5 wherein the solidifying step comprises a curing step.

* * * * *